Patented Aug. 22, 1950

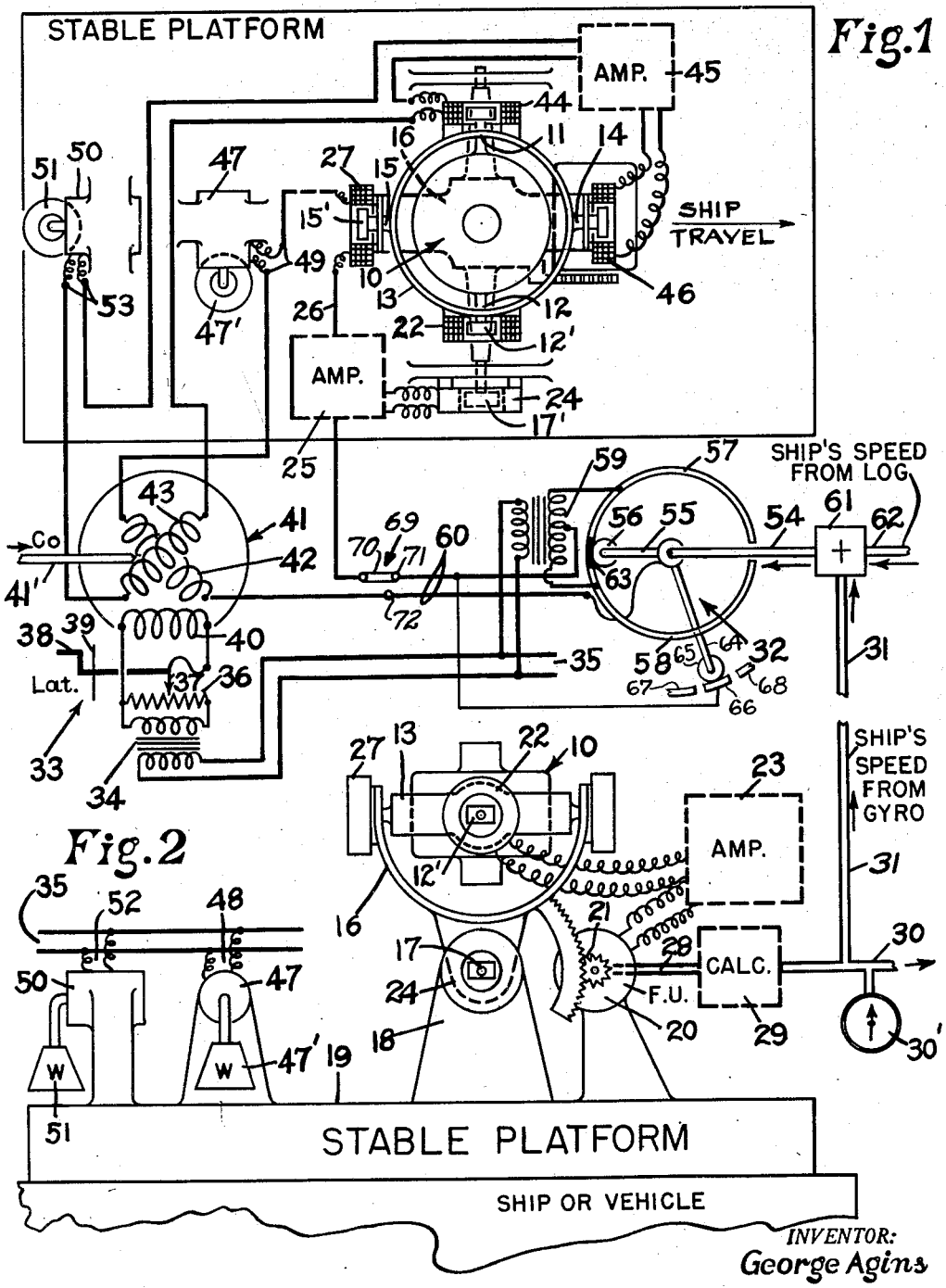

2,519,422

UNITED STATES PATENT OFFICE 2,519,422

GROUND SPEED INDICATOR

George Agins, Brooklyn, N. Y., assignor to Arma Corporation, Brooklyn, N. Y., a corporation of New York Application March 6, 1946, Serial No. 652,332

19 Claims. (Cl. 264—1)

This invention relates to speed indicators, and has particular reference to mechanism for accurately measuring the speed of a ship or other vehicle in relation to the surface of the earth, with the use of a gyroscope.

As is well known, a gyroscope which is mounted so as to be free of all restraint will maintain its angular position in space, and thus appears to tilt in its mounting about an axis which is the resultant of the rotation of the earth and the travel of the mount, such as a ship, upon the earth's surface. If forces are applied to the gyroscope so as to just neutralize the effect of earth rotation, then the remaining tilt is that due to the travel of the ship on the earth's surface. This tilt may be opposed by a precessional force so that the gyroscope remains tilted by an angle which is a measure of the ship's angular speed rate, which may be converted to linear ship speed by a simple calculation. Such an arrangement is a reliable measure of uniform or slowly changing ship speed, but is too slow to change with change in vehicle velocity. For continuous indication of rapidly changing ship speed, such as is met with in evasive action in modern naval battles, for instance, such a simple device is impracticable. The difficulty has been, in past practice, that speed measurement by a ship's log is not at all accurate, whereas speed measurement by a tilting gyroscope gives values widely out of phase with speed changes because of the great inertia of the gyroscope wheel.

In accordance with the present invention, a speed-indicating mechanism utilizing a gyroscope is provided, whose tilt is confined to the vertical plane of travel of the vehicle (a plane vertical to the horizon plane and containing, or parellel to, the fore and aft axis of the vehicle) and is proportional to the speed and wherein changes in speed are rapidly and accurately measured by pendulous means and directly applied to the gyroscope to correct its indication.

In a preferred embodiment of the invention, the universally-mounted gyroscope in neutral equilibrium is supported on a stable platform and is further stabilized against rotation of the earth, so that it tilts solely in the plane of travel of the vehicle so that the tilt is a continuous measure of the ship's speed and may be transmitted to a suitable speed indicator or to calculating apparatus, such as gun fire control apparatus, or both. In order that the apparatus will not lag during rapid speed and course changes of the ship, due to the inherent characteristics of the gyroscope, pendulous means responsive to accelerations in the fore-and-aft plane, and to change in course in the athwartships plane, apply precessional torques around the proper gyroscope support axes to thereby proportionally correct for such changes in speed and course. Means are also provided for placing the apparatus into immediate action with the aid of the ship's log, in starting and in case the gyroscope has become de-energized.

It will be seen that the gyroscopic speed indicator of this invention is accurate under all operating conditions, including rapid changes in speed and course which are accurately measured and used to momentarily precess the gyroscope to keep its indication up to date, so that the great inertia of the gyroscope gives a reliable ripple-free indication of ship speed, and the acceleration measurements keep the indication of the gyroscope up to date, at all times.

For a more complete understanding of the invention, reference may be had to the accompanying drawing, in which:

Figure 1 is a schematic mechanical and electrical diagram of the speed-indicator of this invention as seen in plan; and, Fig. 2 is a similar diagrammatic side view of the speed-indicator shown in Fig. 1.

Referring to this drawing, numeral 10 designates a gyroscope having its spin axis arranged vertically and mounted on sensitive bearings 11 and 12 in a horizontal gimbal ring 13, which in turn is mounted in sensitive bearings 14 and 15 on the phantom or follow-up frame 16 pivoted about an eccentric axis 17 on a pedestal 18 fixed to the stable platform 19, carried on a ship or other vehicle whose speed is to be continuously measured. Platform 19 may be stabilized in any suitable way, such as by a stable gyroscope vertical, an example of such stabilization being disclosed in copending application Serial No. 607,614, filed July 28, 1945, by applicant.

With the described mounting gyroscope 10 has three degrees of freedom, i. e., the instrument is universally mounted.

A servo-motor 20 is provided on the stable platform 19 and arranged through the gearing 21 to swing the phantom frame 16 in the plane of vehicle travel about its axis 17 in synchronism with the swinging of the gyroscope 10 about its corresponding axis 11—12. This follow-up action of the gyroscope 10 by frame 16 is accomplished in well-known manner by null coil 22 on the transverse axis trunnion of the gyroscope 10, a voltage being generated in coil 22 upon relative angular movement between it and armature 12' on the gyroscope 10. Coil 22 is electrically connected to the input of a conventional electronic power amplifier 23, whose power output is connected to the follow-up motor 20, as shown, so that phantom frame 16 and null coil 22 carried thereby, are restored to neutral relative angular position such that a voltage is no longer generated in coil 22 and motor 20 is deenergized. By this means the bearings 11 and 12 of the gyroscope 10 do not have any appreciable relative rotation and accordingly the gyroscope 10 is undisturbed by bearing friction.

However, the above-described arrangement is still responsive to relative movement of the ship in space, so that the gyroscope 10 will tilt further and further, in duplication of the angular travel of the ship upon the earth and the rotation of the earth itself. Since this tilt is in response to a displacement rather than speed, which is not desired, it is corrected by an angle-measuring null coil 24 about axis 17, similar to coil 22 and connected as shown in Fig. 1 to amplifier 25. The relative tilt between coil 24 and armature 17' generates a voltage proportional to the tilt in coil 24, which, amplified in 25, is fed into the circuit 26 containing the torque motor coil 27 mounted on frame 16 and having in its field the armature 15' carried by gimbal 13, which accordingly responds to this field and applies torque to the connected gyroscope 10 around the axis 14, 15. This torque is of such polarity that it causes precession of the gyroscope 10 around its axis 11, 12, in opposite direction to the natural tilting above described so that, when the correction for earth's rotation is applied, and equilibrium is found, the offset angle of the gyroscope 10 and its phantom member 16 from vertical is a measure of ship's angular speed, as indicated on the output shaft 28 of the motor 20. This angle is fed by shaft 28 into a suitable calculator 29, where, by mechanism well known, the angular speed value is changed to linear or surface speed value, which may be fed as at 30, to an indicator 30' or fire-control or other instruments, and at 31 to the initial set-up device 32, to be described.

In order that the output 28 may not be in error because of the rotation of the earth, which the gyroscope is unable to distinguish from ship travel, calculating mechanism of well-known type is provided at 33 in Fig. 1 to apply to the gyroscope 10 a counter-precession equal to the earth rotation effect on the same. This mechanism 33 may take the form of potentiometer 36 having its resistance supplied from the secondary winding of a transformer 34, whose primary winding is energized from an alternating current source 35. A brush or slider 37 on the resistance of potentiometer 36 is adjustable by means of hand-crank 38 in accordance with a function of the latitude set on dial 39. The voltage output of potentiometer 36 is accordingly proportional to $H\omega \cos \lambda$, where H is the angular momentum of the spinning element of the gyroscope; $\omega$ is the angular velocity of the earth; and $\lambda$ is the latitude. This voltage is fed to the stator coil 40 of an electro-magnetic resolver 41.

Resolver 41 comprises a rotor having two coils 42 and 43 mounted in space quadrature in the field of stator coil 40 and adjustable angularly by shaft 41' in accordance with ship's course. Voltages proportional to trigonometric functions of course Co and angular rotation rate of the earth are accordingly induced in rotor coils 42 and 43. Further details of this arrangement are described in copending application Serial No. 600,606, filed June 20, 1945, by applicant. Rotor coil 42 thus delivers current of proper value to the motor 27 to exert a torque about axis 14, 15 causing precession of the gyroscope 10 around the athwart-ship axis 11, 12, of sufficient magnitude to equal the tilt due to this component of earth rotation.

Similarly, the rotor coil 43 delivers current of proper value to torque motor 44 to exert a torque about axis 11—12, causing precession of the gyroscope 10 around the fore-and-aft axis 14—15, of sufficient magnitude to equal this component of earth rotation. This circuit of resolver coil 43 and torque motor 44 also includes the output of amplifier 45 actuated by the tilt measuring pick-up coil 46 on the fore-and-aft axis 14—15, whereby any tendency of the free gyroscope 10 to tilt over sidewise out of the vertical plane of vehicle travel is corrected, this arrangement being similar to that previously described in connection with amplifier 25.

By means of these correcting mechanisms acting in concert, the gyroscope 10 is protected from all sources of error, so that its angle of tilt to the vertical is at all times an indication of true or "ground" speed of the mounting ship or vehicle.

The gyroscope 10 is normally slow-acting and thus sometimes may not respond sufficiently promptly to indicate rapid changes in speed, and in order to expedite its response, the pendulum resolver unit 47 is provided on the stable platform 19. Resolver 47 comprises a shell having a stator coil, not shown, but similar to coil 40 of resolver 41, energized from the alternating current source 35 by wires 48, with a rotor coil similar to coil 42 or 43 of resolver 41 in inductive cooperation with the stator coil and actuated angularly by the simple pendulum 47' mounted to swing freely in the fore-and-aft plane of ship travel, as shown. As the rotor coil swings with the pendulum 47', a current is induced therein which is proportional to acceleration and hence proportional to change in ship speed. This current is fed from unit 47 by wires 49 Fig. 1, into the circuit containing torque coil 27, thus causing a torque to be exerted about axis 14, 15, resulting in a corresponding precession of gyroscope 10 about axis 11—12, which, as previously explained, indicates ship speed. The gyroscope 10 is thus forced to change its response speed in conformity with all rapid changes in ship speed, and accordingly becomes an accurate ground speed indicator for all conditions of operation.

A similar pendulum-actuated unit is provided at 50 on the stable platform 19, having its weight 51 arranged to be responsive to athwartship forces due to accelerations which come into action upon rapid changes in course of the ship. The stator winding of this unit 50 is energized from alternating current source 35 by leads 52 and, as described in connection with unit 47, a current proportional to tilt of pendulum 51, which in turn is proportional to acceleration, is generated in the rotor coil. This current is fed by leads 53 through coil 43 of resolver 41 and the output circuit of amplifier 45 into torque-coil 44 on gyroscope axis 11—12, which applies a torque in the right sense to prevent displacement of the gyroscope out of the vertical, which would occur in rapid turns due to friction in the sensitive mounting bearings.

Because the spin wheel of gyroscope 10 is slow to attain speed, once it has become deenergized for any reason and displaced to some unpredictable position, the gyroscope is not at once available for ship speed indication purposes, so that interim means 32 are provided, which, with the aid of the immediately available ship's log speed indicator, places the invention into immediate use, both at the beginning and after deenergization for some reason. This unit 32 comprises a rotary drive shaft 54 carrying an arm 55 which has a contact wheel or trolley 56 for contacting the concentric live segments 57 and 58 energized from center tap secondary winding of transformer 59, whose primary winding is energized from the common source 35. Arm 55 is mechanically and electrically connected to the arm 64 which has a contact wheel or control 65 for contacting a concentric live segment 66 and dead segments 67 and 68. Trolley shaft 54 is driven by the differential gearing 61, one of whose inputs, 62, is driven from the ship's log, not shown, and whose other input 31 is driven from the output shaft 30 of the speed indicator of this invention. In this way, the trolley shaft 54 always indicates the difference between the ship's log indication of speed and the indication of the apparatus of the invention, the current flowing along leads 60 being a constant current applied to the torque-coil 27 to initially rapidly erect the gyroscope 10, whereupon the input 31 will substantially equal log input 62, thus causing differential 61 to restore trolley 56 to the insulation segment 63, and trolley 65 to the live segment 66. This results in de-energization of the unit 32 since it is no longer needed, the gyroscope 10 then being enabled to assume or resume its function of true ground speed indication, which appears on the shaft 30, as explained. Switch 69 is provided to disconnect unit 32 after it has served its purpose. This is accomplished by switching movable contact 70 from stationary contact 71, to stationary contact 72.

Operation of the gyroscopic speed indicator of this invention, for ships and other unstable vehicles, is readily understood from the foregoing and may be summarized as follows: The gyroscope 10, universally mounted in gimbals 13 and 16 on the ship or other vehicle, is stabilized against the instability of the vehicle, and is further stabilized against tilting due to rotation of the earth by torque motors 27 and 44 controlled by resolver 41 in turn dependent upon latitude adjustment 38, whereby tilting of the gyroscope 10 is due solely to travel of the vehicle around the earth. The phantom member 16 is power-driven by motor 20 in response to tilt of the gyroscope 10 detected by unit 22, so as to follow the same in the vertical plane of vehicle travel, causing torque motor 27 to precess gyroscope 10 in opposition to the tilting due to vehicle travel, whereby the resultant tilt angle of the gyroscope and the phantom member 16 is a continuous measure of the angular speed of the vehicle, which is transmitted by shaft 30 to a remote point, or is indicated on dial 30', or both.

A stabilized acceleration unit 47 for measuring speed change of the vehicle develops proportional currents which are supplied by connections 49 to the torque-motor 27, whereby precessional torque is applied continuously to the gyroscope to correct its speed indication 30 momentarily by the measured acceleration. A second acceleration unit 50 on the stable platform measures angular acceleration due to change of course of the vehicle and develops a proportional current, which is fed to a servo-system having a null coil pick-up 46 on the gimbal axis in the plane of travel and applies torque to the gyroscope to prevent deviation of the same out of the vertical plane of travel, this torque being applied by a torque unit 44 jointly responsive to the pick-up 46 and the second acceleration unit 50. When the gyroscope 10 is started or restarted, means 32 responsive to vehicle speed value from a source 62 independent of the gyroscope 10 initially erects the gyroscope.

Although a preferred embodiment of the invention has been illustrated and described herein, it is to be understood that the invention is not limited thereby, but is susceptible of changes in form and detail within the scope of the appended claims.

I claim:

1. In a ground speed indicator for an unstable vehicle, including a movable indicating member, a gyroscope having a spin axis vertical to the horizon plane, a gimbal support therefor, said support being stabilized on said vehicle against the unstable movements of said vehicle, the combination of means responsive to changes in position of said vehicle for stabilizing said gyroscope against tilting due to movement of the earth, electrical induction means responsive to relative angular movement between said gyroscope spin axis and said support in the plane vertical to the horizon plane containing the line of travel of the vehicle for developing voltage proportional to said angular movement, a follow-up motor energized by said voltage and operatively connected to said support for adjusting the same in said plane to restore said electrical means to non-inductive position, and operative connections between said motor and said indicating member for positioning the same in accordance with said angular movement as indicative of the speed of said vehicle in said plane.

2. In a ground speed indicator for an unstable vehicle, including a movable indicating member, a gyroscope having a spin axis vertical to the horizon plane, a gimbal support therefor having coordinate horizontal axes, said support being stabilized against the unstable movements of said vehicle, the combination of means responsive to changes in position of said vehicle for stabilizing said gyroscope about said axes against tilting due to movement of the earth, electrical induction means responsive to relative angular movement between said gyroscope spin axis and said stabilized support in the plane vertical to the horizon plane containing the line of travel of the vehicle for developing voltage proportional to said angular movement, a follow-up motor energized by said voltage and operatively connected to said support for adjusting the same in said plane to restore said electrical means to non-inductive position, and operative connections between said motor and said indicating member for positioning the same in accordance with said angular movement as indicative of the speed of said vehicle in said plane.

3. In a ground speed indicator for an unstable vehicle, including a movable indicating member, a gyroscope having a spin axis vertical to the horizon plane, a gimbal support therefor, said support being stabilized against the unstable movements of said vehicle, the combination of means responsive to changes in position of said vehicle for stabilizing said gyroscope against tilting due to movement of the earth, electrical induction means having respective cooperating parts on said support and on said gyroscope responsive to relative angular movement between said gyroscope spin axis and said stabilized support in the plane vertical to the horizon plane containing the line of travel of the vehicle for developing voltage proportional to said angular movement, a follow-up motor energized by said voltage and operatively connected to said support for adjusting the same in said plane to restore said parts of said electrical means to non-inductive position, and operative connections between said motor and said indicating member for positioning the same in accordance with said angular movement as indicative of the speed of said vehicle in said plane.

4. In a ground speed indicator for an unstable vehicle, including a movable indicating member, a gyroscope having a spin axis vertical to the horizon plane, a gimbal support therefor having coordinate horizontal axes, said support being stabilized against the unstable movements of said vehicle, the combination of means responsive to changes in position of said vehicle for stabilizing said gyroscope about said axes against tilting due to movement of the earth, electrical induction means having respective cooperating parts on said support and on said gyroscope responsive to relative angular movement between said gyroscope spin axis and said support in the plane vertical to the horizon plane containing the line of travel of the vehicle for developing voltage proportional to said angular movement, a follow-up motor energized by said voltage and operatively connected to said support for adjusting the same in said plane to restore said parts of said electrical means to non-inductive position, and operative connections between said motor and said indicating member for positioning the same in accordance with said angular movement as indicative of the speed of said vehicle in said plane.

5. In a ground speed indicator for an unstable vehicle, including a movable indicating member, a gyroscope having a spin axis vertical to the horizon plane, a gimbal support therefor having coordinate horizontal axes, said support being stabilized against the unstable movements of said vehicle, the combination of electrical means responsive to changes in position of said vehicle due to movement of the earth for developing voltages proportional to the respective angles of tilt of said coordinate axes, torque motor means severally energized by said voltages to exert a torque on said gyroscope to cause the same to precess about said coordinate axes an amount equal to the tilt about the corresponding axes for stabilizing said gyroscope against tilting due to movement of the earth, electrical induction means responsive to relative angular movement between said gyroscope spin axis and said support in the plane vertical to the horizon plane and containing the line of travel of the vehicle for developing a voltage proportional to said angular movement, a follow-up motor energized by said voltage and operatively connected to said support for adjusting the same in said plane to restore said electrical means to non-inductive position, and operative connections between said follow-up motor and said indicating member for positioning the same in accordance with said angular movement as indicative of the speed of said vehicle in said plane.

6. In a ground speed indicator for an unstable vehicle, including a movable indicating member, a gyroscope having a spin axis vertical to the horizon plane, a gimbal support therefor having coordinate horizontal axes, said support being stabilized on said vehicle against the unstable movements of said vehicle, the combination of electrical means responsive to changes in position of said vehicle for developing voltages proportional to the respective angles of tilt of said coordinate axes, torque motor means severally energized by said voltages to exert a torque on said gyroscope to cause the same to precess about said coordinate axes an amount equal to the tilt about the corresponding axes for stabilizing said gyroscope against tilting due to movement of the earth, electrical induction means having respective cooperating parts on said support and on said gyroscope responsive to relative angular movement between said gyroscope spin axis and said support in the plane vertical to the horizon plane and containing the line of travel of the vehicle for developing a voltage proportional to said angular movement, a follow-up motor energized by said voltage and operatively connected to said support for adjusting the same in said plane to restore said parts of said electrical means to non-inductive position, and operative connections between said follow-up motor and said indicating member for positioning the same in accordance with said angular movement as indicative of the speed of said vehicle in said plane.

7. In a ground speed indicator for an unstable vehicle, including a movable indicating member, a gyroscope having a spin axis vertical to the horizon plane, a gimbal suspension therefor, a support, said support being stabilized against the unstable movements of said vehicle, the combination of a frame carrying said support and pivoted about a horizontal axis normal to the plane vertical to the horizon plane containing the line of travel of the vehicle, means responsive to changes in position of said vehicle for stabilizing said gyroscope against tilting due to movement of the earth, electrical induction means responsive to relative angular movement between said gyroscope spin axis and said support in the plane vertical to the horizon plane and containing the line of travel of the vehicle for developing voltage proportional to said angular movement, a follow-up motor energized by said voltage and operatively connected to said frame for adjusting the same in said plane to restore said electrical means to non-inductive position, and operative connections between said motor and said indicating member for positioning the same in accordance with said angular movement as indicative of the speed of said vehicle in said plane.

8. In a ground speed indicator for an unstable vehicle, including a movable indicating member, a gyroscope having a spin axis vertical to the horizon plane, a gimbal suspension therefor, a support, said support being stabilized against the unstable movements of said vehicle, the combination of a frame carrying said support and pivoted about a horizontal axis normal to the plane vertical to the horizon plane and containing the line of travel of the vehicle, means responsive to changes in position of said vehicle for stabilizing said gyroscope against tilting due to movement of the earth, electrical induction means having respective cooperating parts on said gyroscope and gimbal suspension responsive to relative angular movement between said gyroscope spin axis and said support in the plane vertical to the horizon plane and containing the line of travel of the vehicle for developing voltage proportional to said angular movement, a follow-up motor energized by said voltage and operatively connected to said frame for adjusting the same in said plane to restore said parts of said electrical means to non-inductive position, and operative connections between said follow-up motor and said indicating member for positioning the same in accordance with said angular movement as indicative of the speed of said vehicle in said plane.

9. In a ground speed indicator for an unstable vehicle, including a movable indicating member, a gyroscope having a spin axis vertical to the horizon plane, a gimbal support therefor, said support being stabilized on said vehicle against the unstable movements of said vehicle, the combination of means responsive to changes in position of said vehicle for stabilizing said gyroscope against tilting due to movement of the earth, means responsive to acceleration of said vehicle for modifying the response of said means, electrical induction means responsive to relative angular movement between said gyroscope spin axis and said support in the plane vertical to the horizon plane and containing the line of travel of the vehicle for developing voltage proportional to said angular movement, a follow-up motor energized by said voltage and operatively connected to said support for adjusting the same in said plane to restore said electrical means to non-inductive position, and operative connections between said motor and said indicating member for positioning the same in accordance with said angular movement as indicative of the speed of said vehicle in said plane.

10. In a ground speed indicator for an unstable vehicle, including a movable indicating member, a gyroscope having a spin axis vertical to the horizon plane, a gimbal support therefor, said support being stabilized on said vehicle against the unstable movements of said vehicle, the combination of means responsive to changes in position of said vehicle for stabilizing said gyroscope against tilting due to movement of the earth, means responsive to acceleration of said vehicle in the plane vertical to the horizon plane and containing the line of travel thereof for modifying the response of said means, electrical induction means responsive to relative angular movement between said gyroscope spin axis and said support in the plane vertical to the horizon plane and containing the line of travel of the vehicle for developing voltage proportional to said angular movement, a follow-up motor energized by said voltage and operatively connected to said support for adjusting the same in said plane to restore said electrical means to non-inductive position, and operative connections between said follow-up motor and said indicating member for positioning the same in accordance with said angular movement as indicative of the speed of said vehicle in said plane.

11. In a ground speed indicator for an unstable vehicle, including a movable indicating member, a gyroscope having a spin axis vertical to the horizon plane, a gimbal support therefor, said support being stabilized on said vehicle against the unstable movements of said vehicle, the combination of means responsive to changes in position of said vehicle for stabilizing said gyroscope against tilting due to movement of the earth, means responsive to acceleration of said vehicle in a plane normal to the plane vertical to the horizon plane and containing the line of travel of the vehicle for modifying the response of said means, electrical induction means responsive to relative angular movement between said gyroscope spin axis and said support in the said vertical plane for developing voltage proportional to said angular movement, a follow-up motor energized by said voltage and operatively connected to said support for adjusting the same in said plane to restore said electrical means to non-inductive position, and operative connections between said follow-up motor and said indicating member for positioning the same in accordance with said angular movement as indicative of the speed of said vehicle in said plane.

12. In a ground speed indicator for an unstable vehicle, including a movable indicating member, a gyroscope having a spin axis vertical to the horizon plane, a gimbal support therefor, said support being stabilized on said vehicle against the unstable movements of said vehicle, the combination of electrical means responsive to changes in position of said vehicle for stabilizing said gyroscope against tilting due to movement of the earth, means responsive to acceleration of said vehicle for developing a voltage proportional thereto, modifying connections between said last-named and first-named means, electrical induction means responsive to relative angular movement between said gyroscope spin axis and said support in the plane vertical to the horizon plane and containing the line of travel of the vehicle for developing voltage proportional to said angular movement, a follow-up motor energized by said voltage and operatively connected to said support for adjusting the same in said plane to restore said electrical means to non-inductive position, and operative connections between said follow-up motor and said indicating member for positioning the same in accordance with said angular movement as indicative of the speed of said vehicle in said plane.

13. In a ground speed indicator for an unstable vehicle, including a movable indicating member, a gyroscope having a spin axis vertical to the horizon plane, a gimbal support therefor having coordinate horizontal axes, said support being stabilized against the unstable movements of said vehicle, the combination of electrical means responsive to changes in position of said vehicle for developing voltages proportional to the respective angles of tilt of said coordinate axes, torque motor means severally energized by said voltages to exert a torque on said gyroscope to cause the same to precess about said coordinate axes an amount equal to the tilt about the corresponding axes for stabilizing said gyroscope against tilting due to movements of the earth, means responsive to acceleration of said vehicle for modifying the response of said torque motor means, electrical induction means responsive to relative angular movement between said gyroscope spin axis and said support in the plane vertical to the horizon plane and containing the line of travel of the vehicle for developing a voltage proportional to said angular movement, a follow-up motor energized by said voltage and operatively connected to said support for adjusting the same in said plane to restore said electrical means to non-inductive position, and operative connections between said follow-up motor and said indicating member for positioning the same in accordance with said angular movement as indicative of the speed of said vehicle in said plane.

14. In a ground speed indicator for an unstable vehicle, including a movable indicating member, a gyroscope having a spin axis vertical to the horizon plane, a gimbal support therefor having coordinate horizontal axes, said support being stabilized against the unstable movements of said vehicle, the combination of electrical means responsive to changes in position of said vehicle for developing voltages proportional to the respective angles of tilt of said coordinate axes, torque motor means severally energized by said voltages to exert a torque on said gyroscope to cause the same to precess about said coordinate axes an amount equal to the tilt about the corresponding axes for stabilizing said gyroscope against tilting due to movement of the earth, means responsive to acceleration of said vehicle in the plane vertical to the horizon plane and containing the line of travel of the vehicle and in a plane normal thereto for developing voltages proportional to the corresponding tilt of the gyroscope in said planes, connections between said last-named means and the corresponding torque motor means for modifying the response of said torque motor means, electrical induction means responsive to relative angular movement between said gyroscope spin axis and said support in said plane of travel of the vehicle for developing a voltage proportional to said angular movement, a follow-up motor energized by said voltage and operatively connected to said support for adjusting the same in said plane to restore said electrical means to non-inductive position, and operative connections between said follow-up motor and said indicating member for positioning the same in accordance with said angular movement as indicative of the speed of said vehicle in said plane.

15. In a ground speed indicator for an unstable vehicle, including a movable indicating member, a gyroscope having a spin axis vertical to the horizon plane, a gimbal support therefor having coordinate horizontal axes, said support being stabilized against the unstable movements of said vehicle, the combination of electrical means responsive to changes in position of said vehicle for developing voltages proportional to the respective angles of tilt of said coordinate axes, torque motor means severally energized by said voltages to exert a torque on said gyroscope to cause the same to precess about said coordinate axes an amount equal to the tilt about the corresponding axes for stabilizing said gyroscope against tilting due to movement of the earth, pendulum means responsive to acceleration of said vehicle for developing a voltage proportional to the swing of the pendulum, connections between said last-named means and said torque motor means for modifying the response of said torque motor means, electrical induction means responsive to relative angular movement between said gyroscope spin axis and said support in the plane vertical to the horizon plane and containing the line of travel of the vehicle for developing a voltage proportional to said angular movement, a follow-up motor energized by said voltage and operatively connected to said support for adjusting the same in said plane to restore said electrical means to non-inductive position, and operative connections between said follow-up motor and said indicating member for positioning the same in accordance with said angular movement as indicative of the speed of said vehicle in said plane.

16. In a ground speed indicator for an unstable vehicle, including a movable indicating member, a gyroscope having a spin axis vertical to the horizon plane, a gimbal suspension therefor having coordinate horizontal axes, the combination of electrical means responsive to changes in position of said vehicle for developing a voltage proportional thereto, a torque motor responsive to said voltage for erecting said gyroscope axis into the plane vertical to the horizon plane and containing the line of travel of said vehicle, electrical means responsive to relative movement between said gyroscope axis and said suspension through an angle in said plane for developing a voltage proportional to said movement, a follow-up motor energized by said last-named voltage and operatively connected to said suspension for restoring said suspension through said angle, means responsive to the speed of said vehicle relatively to the earth, a differential jointly actuated by said last-named means and said follow-up motor, a source of electric power, a switch interposed between said source and said torque motor for erecting said gyroscope, operative connections between said differential and said switch for controlling the same, and operative connections between said follow-up motor and said member for positioning the same as indicative of the speed of said vehicle in said plane.

17. In a ground speed indicator for an unstable vehicle, including a movable indicating member, a gyroscope having a spin axis vertical to the horizon plane, a gimbal suspension therefor having coordinate horizontal axes, the combination of electrical means responsive to changes in position of said vehicle for developing a voltage proportional to the corresponding angle of tilt of each of said axes, a torque motor responsive to each said voltage for erecting said gyroscope spin axis into the plane vertical to the horizon plane and containing the line of travel of said vehicle and for stabilizing said other axis in the coordinate vertical plane, electrical means responsive to relative movement between said gyroscope axis and said suspension through an angle in said plane for developing a voltage proportional to said movement, a follow-up motor energized by said last-named voltage and operatively connected to said suspension for restoring said suspension through said angle, means responsive to the speed of said vehicle relatively to the earth, a differential jointly actuated by said last-named means and said follow-up motor, a source of electric power, a switch interposed between said source and one of said torque motors for erecting said gyroscope, operative connections between said differential and said switch for controlling the same, and operative connections between said follow-up motor and said member for positioning the same as indicative of the speed of said vehicle in said plane.

18. In a ground speed indicator for an unstable vehicle, a movable indicating member, a gyroscope having its spin axis contained in the plane vertical to the horizon plane and containing the line of travel of the vehicle, gimbal suspension means for said gyroscope, a support for said gimbal suspension stabilized on the vehicle against the unstable movements thereof, and means for precluding angular displacement between the gyroscope spin axis and said stabilized support due to rotation of the earth, the combination of electrical induction means responsive to angular displacement between said stabilized support and said gyroscope spin axis within the said vertical plane as caused by movement of said vehicle relatively to the earth for developing a voltage proportional to said movement, means responsive to the induced voltage for precessing said gyroscope to return the spin axis thereof in the direction of its initial angular position relatively to said support at a rate directly proportional to the angular displacement of said gyro spin axis relatively to said support, and means for measuring the said angular displacement and for actuating said indicating member in accordance with said angular displacement as indicative of the speed of said vehicle in said plane.

19. In a ground speed indicator for an unstable vehicle, a movable indicating member, a gyroscope having its spin axis contained in the plane vertical to the horizon plane and containing the line of travel of the vehicle, a gimbal suspension for the gyroscope, a first supporting member for said suspension pivotally secured thereto, a second support for said first support pivotally secured thereto and stabilized against unstable movements of the vehicle, and means for precluding angular displacement between said gyro spin axis and said stabilized support due to rotation of the earth, the combination of first electrical induction means responsive to angular movement between said gyro spin axis and said first support in said vertical plane for developing a first voltage proportional to said movement, means responsive to said voltage for pivoting said first support relatively to said second support to restore said first induction means to non-inductive relationship, second electrical induction means responsive to pivotal movement between said first and second supports in said vertical plane for developing a second voltage proportional to said movement, torque means responsive to said second voltage for precessing the gyro spin axis toward its original angular relationship to said stabilized support at a rate which is a function of the relative movement between said vehicle and the earth, and means responsive to the amount of angular displacement between said first and second supports for actuating said indicating member as indicative of the velocity of said vehicle in the said vertical plane.

GEORGE AGINS.

REFERENCES CITED

The following references are of record in the file of this patent:

UNITED STATES PATENTS

| Number | Name | Date |
|---|---|---|
| 1,612,405 | Weaver | Dec. 28, 1926 |
| 1,692,412 | Koenig | Nov. 20, 1928 |
| 1,930,096 | Henderson | Oct. 10, 1933 |
| 1,933,493 | Chessin | Oct. 31, 1933 |
| 1,970,442 | Wittkuhns et al. | Aug. 14, 1934 |
| 2,346,798 | Summers | Apr. 18, 1944 |
| 2,411,087 | Ford | Nov. 12, 1946 |
| 2,412,614 | Haskins | Dec. 17, 1946 |
| 2,427,158 | Poitras | Sept. 9, 1947 |